United States Patent [19]
Lee

[11] Patent Number: 5,515,356
[45] Date of Patent: May 7, 1996

[54] DISK CHANGER DRIVING APPARATUS FOR MULTI-DESK PLAYERS DRIVEN BY A SINGLE MOTOR

[75] Inventor: Hyun-woo Lee, Suwon, Rep. of Korea

[73] Assignee: Samsung Electronics Corporation, Kyungki, Rep. of Korea

[21] Appl. No.: 148,924

[22] Filed: Nov. 5, 1993

[30] Foreign Application Priority Data

Dec. 17, 1992 [KR] Rep. of Korea .................. 92-24624

[51] Int. Cl.⁶ .......................... G11B 17/04; G11B 15/68
[52] U.S. Cl. .................. 369/178; 369/36; 360/92
[58] Field of Search .................. 369/36, 34, 178, 369/191, 192; 360/92; 414/280, 751, 752, 753

[56] References Cited

U.S. PATENT DOCUMENTS

| | | | |
|---|---|---|---|
| 3,774,915 | 11/1973 | Kozu et al. | 360/92 |
| 4,594,042 | 6/1986 | Hoffman | 360/92 |
| 4,858,743 | 8/1989 | Paraskevakos et al. | 194/205 |
| 5,036,503 | 7/1991 | Tomita | 369/36 |
| 5,043,962 | 8/1991 | Wanger et al. | 369/36 |
| 5,173,889 | 12/1992 | Nagahisa et al. | 369/178 |
| 5,228,016 | 7/1993 | Menke | 369/36 |

*Primary Examiner*—Stuart S. Levy
*Assistant Examiner*—William R. Korzuch
*Attorney, Agent, or Firm*—Sughrue, Mion, Zinn, Macpeak & Seas

[57] ABSTRACT

A disk changer for selecting and drawing disk trays from a disk tray drawer using the same motor for both elevational movement of the disk changer and lateral/horizontal movement of the disk tray lever. An idler gear, which is driven by the motor, is selectively engaged with an elevational control gearing mechanism and a lateral movement gearing mechanism. A power switching plate having cam grooves therein controls position changes of the idler gear.

5 Claims, 5 Drawing Sheets

DISK CHANGER DRIVING APPARATUS FOR MULTI-DESK PLAYERS DRIVEN BY A SINGLE MOTOR

BACKGROUND OF THE INVENTION

The present invention relates to a disk changer driving apparatus for multi-disk players, and more particularly, to a disk changer driving apparatus for multi-disk players to be driven by a motor.

In a disk changer driving apparatus for a conventional multi-disk player, a disk changer is provided with a disk tray drawing portion which draws a disk tray from the disk tray drawer accommodating multiple disk trays and a mobile portion moving the disk changer into the relevant disk tray drawing position of the disk tray drawer, in which the disk tray drawing portion and mobile portion are driven by the respective motors.

However, in such a disk changer driving apparatus, since the disk tray drawing portion and the mobile portion are driven by separate motors, plural motors and respective controllers for controlling the motors are needed. Therefore, the structure is complicated, and this increases the cost of the multi-disk player.

SUMMARY OF THE INVENTION

An object of the present invention is to provide a disk changer driving apparatus of a multi-disk player, wherein a disk tray drawing lever driving means (for pulling a selected tray from a drawer) and an elevation driving means (which moves the disk changer elevationally to a position adjacent a selected disk) are driven by a single motor.

To accomplish the above object, the disk changer driving apparatus of the invention comprises a drawing lever driving means for reciprocating a disk tray drawing lever; an elevating driving means for elevating the disk changer; a motor; and power switching means for transmitting the power of the motor selectively to the drawing lever driving means and to the elevating driving means.

According to the present invention, the disk tray drawing lever driving means and the disk changer elevating driving means are driven by a single motor. Therefore, the structure is simplified and the cost is reduced.

BRIEF DESCRIPTION OF THE DRAWINGS

The above objects and other advantages of the present invention will be understood with reference to the following description of a preferred embodiment thereof with reference to the attached drawings in which.

DETAILED DESCRIPTION OF THE INVENTION

Figure 1:
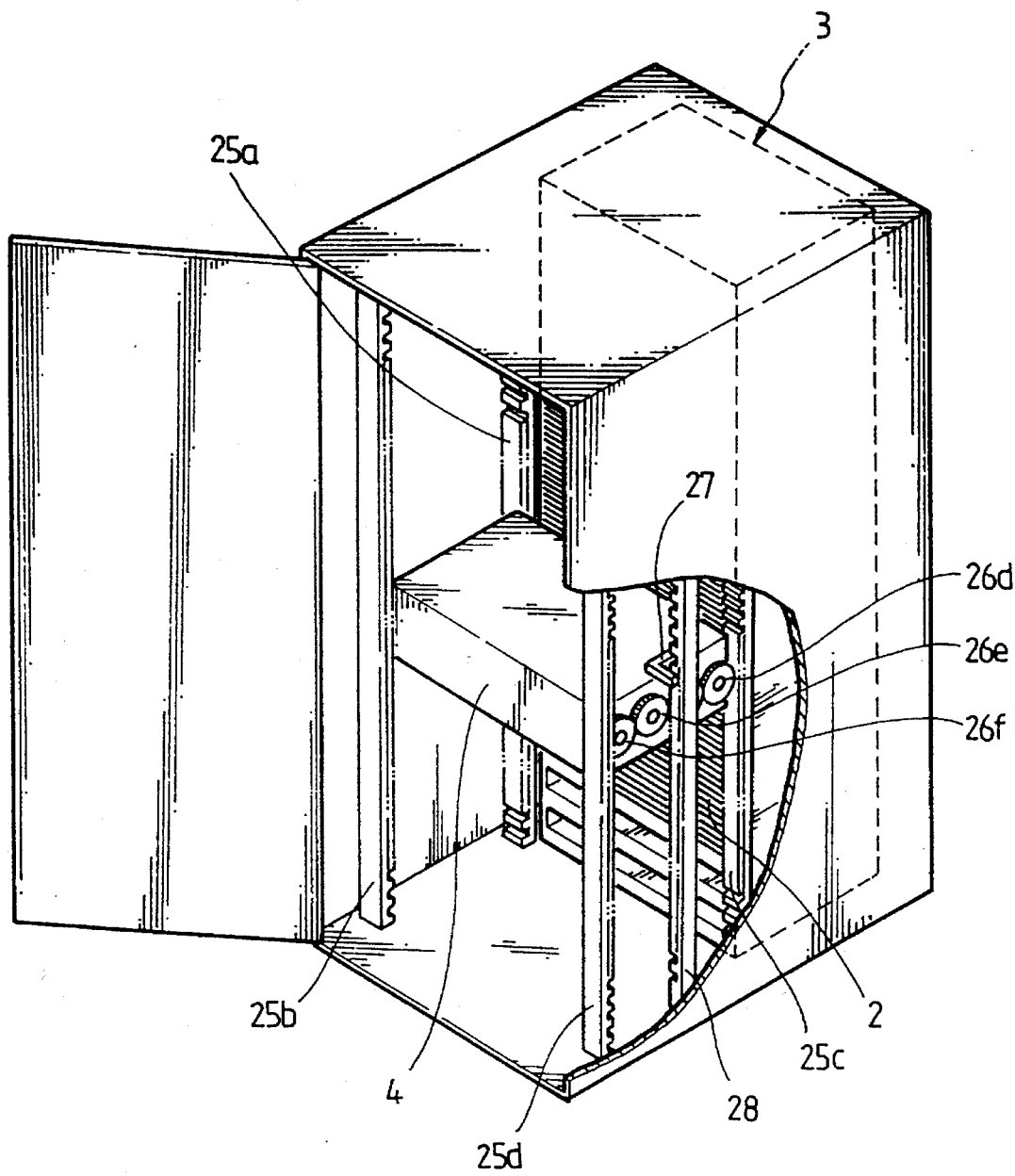
FIG. 1 is a schematic perspective view of a disk changer driving apparatus of a multi-disk player according to the present invention.

As shown in FIGS. 1 to 6, a disk changer driving apparatus of a multi-disk player according to the present invention, comprises a disk changer 4 provided with disk tray drawing lever driving means 10, which draws a disk tray 2 from a disk tray drawer 3, where a plurality of disk trays are accommodated. A disk changer elevating means 20 moves disk changer 4 to the drawing position of the relevant disk tray of disk tray drawer 3. The apparatus also includes a motor 1 and a power switching portion 30, which transmits the power of motor 1 selectively to disk tray drawing lever driving means 10 and disk changer elevating means 20.

Motor 1 is installed in disk changer 4 with its rotary axis thereof vertically oriented. On the upper portion of the rotary axis of motor 1, there is installed a rotary encoder 5, comprising a rotary circular plate 5a and a photosensor 5b, for counting the revolutions of the motor.

Disk tray drawing lever driving means 10 comprises four first connection gears 11a, 11b, 11c and 11d, installed so as to be combined successively with the upper portion of disk changer 4, a pulley gear 12 meshed with gear 11d, and a first belt 13 driven by pulley gear 12 and engaged with a second pulley gear 12b, which is installed spaced apart from a first pulley gear 12a by a predetermined interval. On one side of belt 13, a disk tray drawing lever 15 is fixedly installed. The belt 13 may be a timing belt, otherwise referred to as a power transmission belt, having evenly spaced teeth on the bottom side thereof to engage with grooves cut in the periphery of the pulley. This arrangement produces a positive, non-slip, constant-speed drive.

A third sensor 16 and a fourth sensor 17 are installed in disk changer 4. The third sensor 16 draws a disk tray 2 by rotating motor 1 in the reverse direction when drawing lever 15 is positioned within drawing groove 2a of disk tray 2. Fourth sensor 17 stops motor 1 and at the same time moves solenoid 37 when disk tray 2 has been fully withdrawn from the disk tray drawer 3.

A plurality of guide rollers 6 are installed in disk changer 4, so that disk tray 2 can be easily withdrawn.

Disk changer elevating means 20 comprises a first elevating gear 21 installed in disk changer 4. On the upper portion of gear 21, a worm 21a is installed. A worm wheel 23 meshes with worm 21a and is installed on connection axis 22. A pair of second elevating gears 24 are installed on both ends of connection axis 22. Four racks 25a, 25b, 25c and 25d are installed at the corners of disk changer 4, and six second connecting gears 26a, 26b, 26c, 26d, 26e and 26f are installed on either side of disk changer 4, for respectively connecting second elevating gears 24 and four racks 25a, 25b, 25c and 25d.

Also, in disk changer 4 and the main body in which the disk changer is installed, there are installed a photosensor 27 and a hole position sensor bracket 28. The photosensor 27 senses the position of disk changer 4 and stops disk changer 4 at the drawing position of the disk tray.

Figure 2:
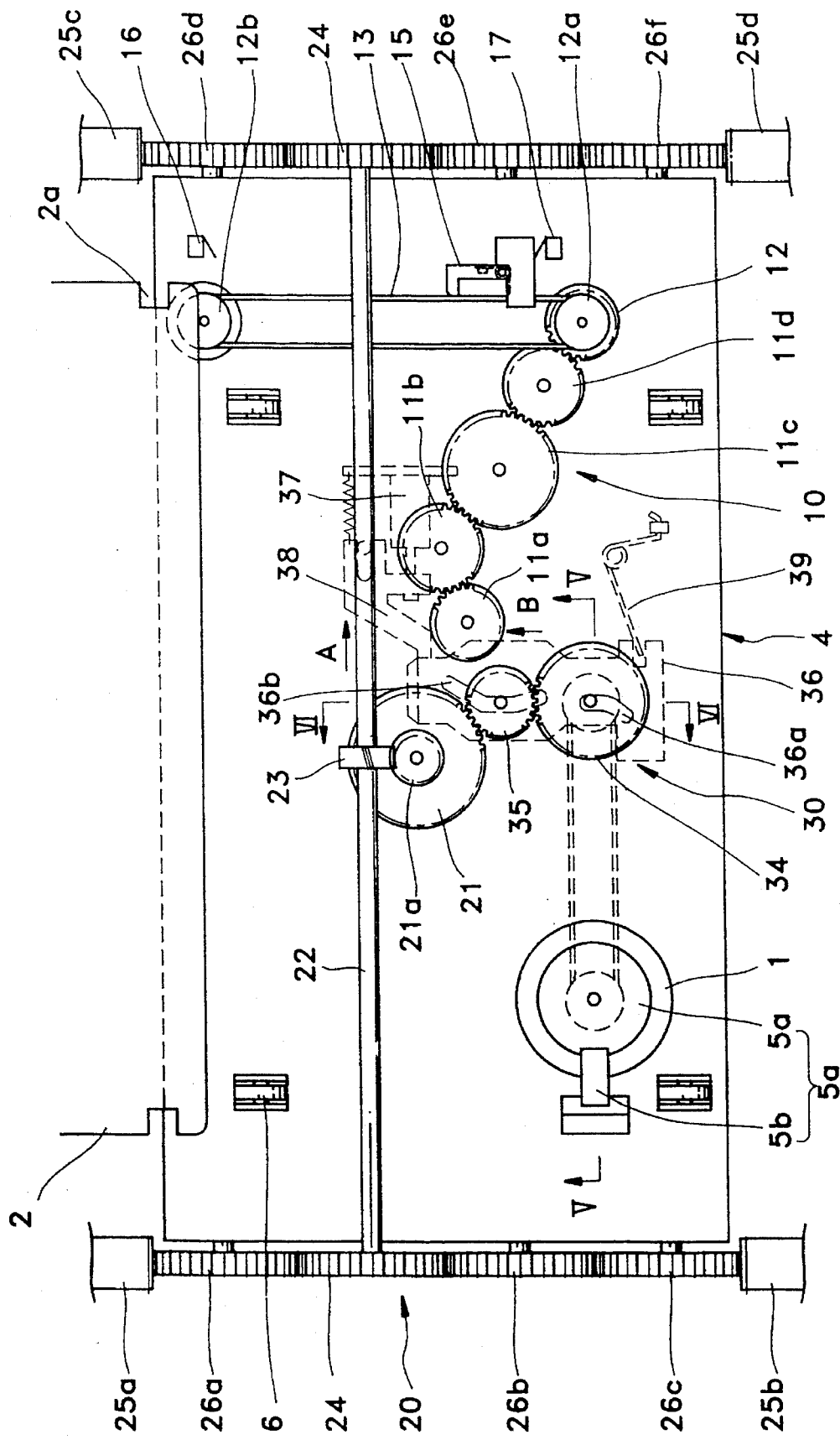
FIG. 2 is a top plan view of a disk changer of a multi-disk player according to the present invention, showing an idler gear connected with a first elevating gear of a disk changer elevating means.
Figure 4:
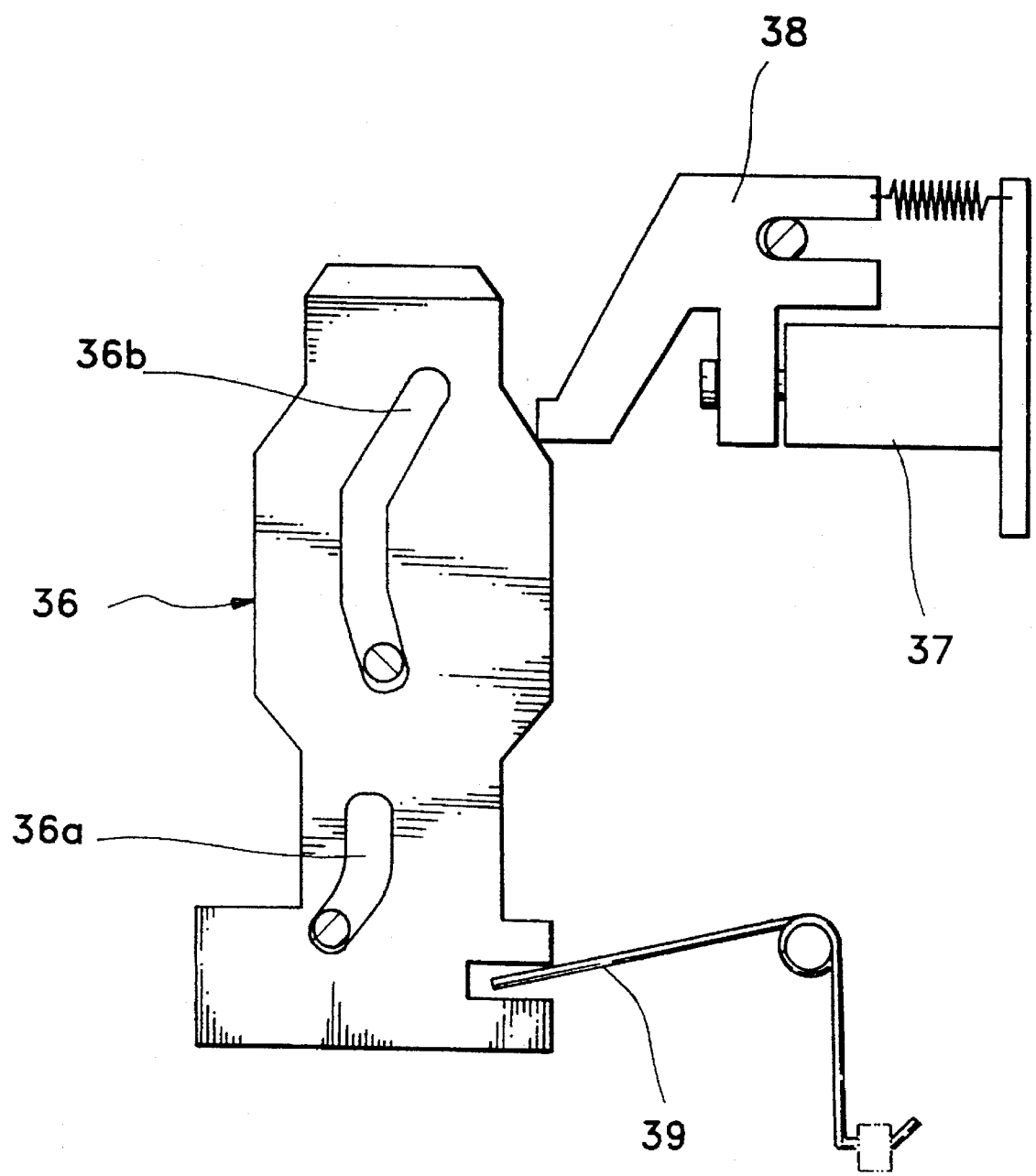
FIG. 4 is an extracted plan view of the essential parts of FIG. 2.
Figure 5:
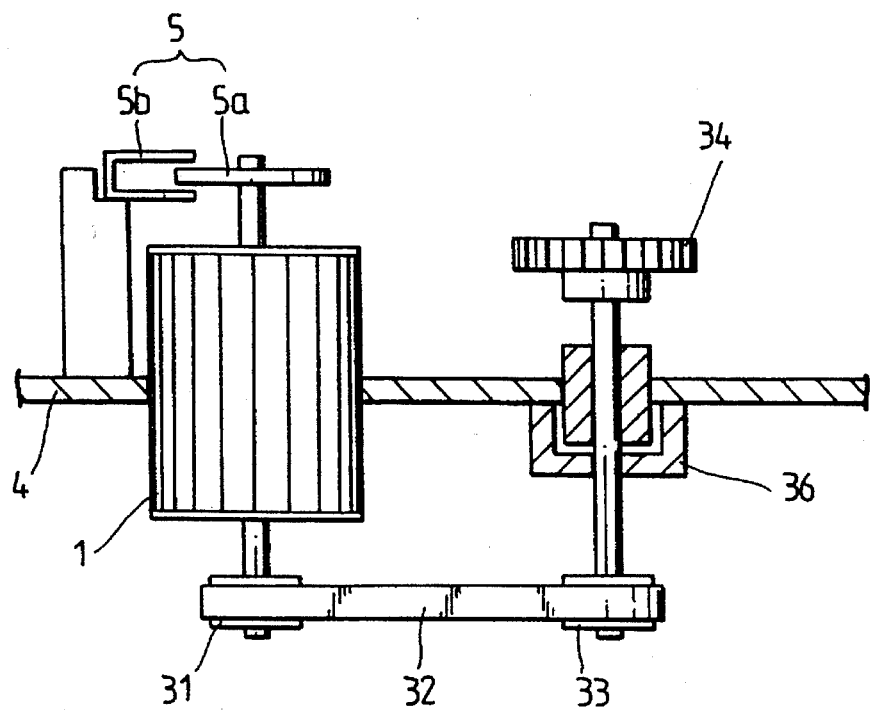
FIG. 5 is a cross-sectional view along line V—V of FIG. 2.
Figure 6:
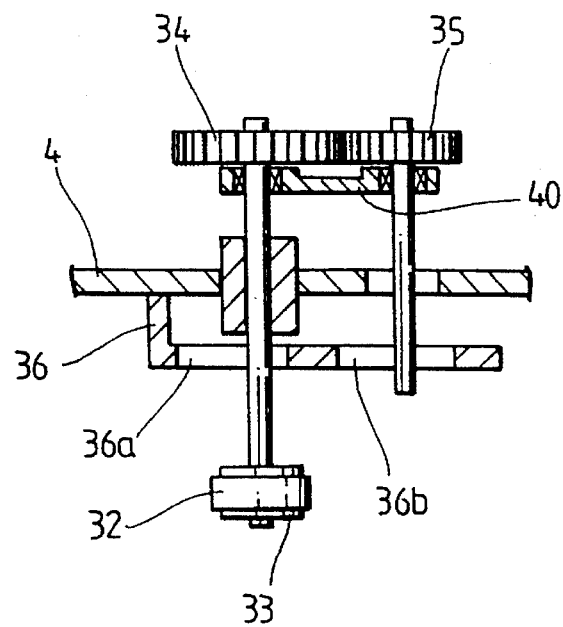
FIG. 6 is a cross-sectional view along line VI—VI of FIG. 2.

As illustrated in FIGS. 2 and 5, power switching means 30 comprises a driving pulley 31 installed in the bottom side of the rotary axis of motor 1, an idler pulley 33 connected with driving pulley 31 through a second belt 32, a driving gear 34 installed in the axis of idler pulley 33, an idler gear 35 meshed with driving gear 34 and selectively meshed with initial first connecting gear 11a of disk tray drawing lever driving means 10 and first elevating gear 21 of disk changer elevating means 20, respectively, a power switching plate 36 which moves idler gear 35 to initial first connecting gear 11a of disk tray drawing lever driving means 10, and a push lever 38 which presses power switching plate 36 toward first elevating gear 21 of disk changer elevating means 20 so that idler gear 35 meshes with first elevating gear 21. Power switching plate 36 is installed so as to be elastically biased toward disk tray drawer 3 by torsion spring 39, as illustrated in FIG. 4. In the power switching plate 36, guide slots 36a and 36b are slidably combined with the axes of driving gear 34 and idler gear 35, respectively. Push lever 38 is installed so as to be laterally moved by solenoid 37. Also, the axis of driving gear 34 is pivotally bearing-combined with disk changer 4, and idler gear 35 is pivotally bearing-combined with a supporting plate 40 fixedly installed in the axis of driving gear 34 and is installed so as to be moved together with driving gear 34.

Guide slot 36a is formed as an obtuse angle. Guide slot 36b is formed as two obtuse angles.

The disk changer driving apparatus of the multi-disk player having the above composition according to the present invention operates as follows.

First, when a user selects a desired disk tray 2 from the disk tray drawer 3 where a plurality of disk trays are accommodated, the motor 1 starts to rotate and the rotary encoder 5 counts and controls the number of revolutions of motor 1.

The power of motor 1 is transferred to idler pulley 33 by driving pulley 31 and second belt 32, causing driving gear 34 and idler gear 35 to rotate.

As illustrated in FIG. 2, as first elevating gear 21 is rotated by idler gear 35, resulting in worm 21a rotating worm wheel 23, connecting rod 22 and second elevating gears 24, installed in both ends of connecting rod 22, start to rotate.

This results in the rotation of second connecting gears 26a, 26b, 26c, 26d, 26e and 26f, which cause disk changer 4 to move tip or down along racks 25a, 25b, 25c and 25d, depending on the direction of rotation of motor 1. A sensor bracket 28 and a second photosensor 27 cooperate to sense the position of disk changer 4 relative to the disk trays. The bracket 28 has holes therein corresponding to the withdrawal positions of the disk trays. The photosensor thereby senses whether or not the position of disk changer 4 is at a position corresponding to a withdrawal position by sensing the holes in bracket 28. When second photosensor 27 and a hole position sensor bracket 28 installed in disk changer 4 sense that disk changer reaches the drawing position of a desired disk tray, motor 1 stops. Accordingly, disk changer 4 will stop at the drawing position of the user-desired disk tray.

When disk changer 4 stops at the drawing position of the desired disk tray, solenoid 37 operates and pulls push lever 38 in the direction of arrow "A," thus separating the push lever from power switching plate 36.

Figure 3:
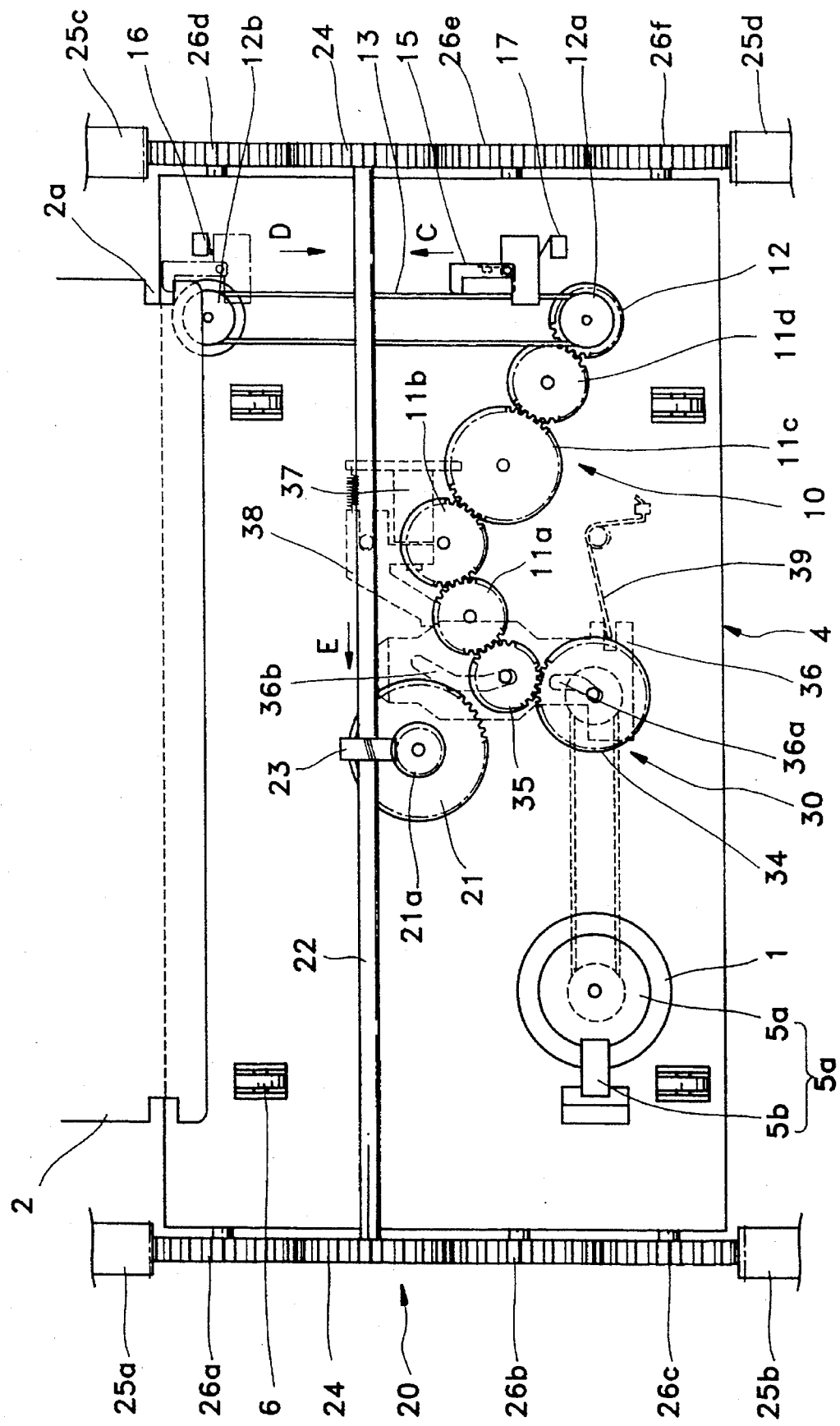
FIG. 3 is a top plan view of a disk changer of a multi-disk player according to the present invention, showing an idler gear engaged with the initial first connection gear of a disk tray drawing lever driving means.

Therefore, power switching plate 36 is moved in the direction of arrow "B" by the elasticity of torsion spring 39, causing idler gear 35 to disengage elevating gear 21 and to engage the initial first connecting gear 11a, as illustrated in FIG. 3.

When idler gear 35 is engaged with initial first connecting gear 11a, motor 1 is driven again, to thereby rotate pulley gear 12 via first connecting gears 11a, 11b, 11c and 11d. When first belt 13 connected to pulley gear 12 is driven, disk cartridge drawing lever 15 installed thereon is moved in the direction of arrow "C" to engage with drawing groove 2a of disk tray 2. When lever 15 arrives at the point where it engages groove 2a, this position is detected by the third sensor 16. This causes motor 1 to rotate reversely and drive gear 34, idler gear 35, connecting gears 11a, 11b, 11c and 11d and pulley gear 12 to rotate reversely. Accordingly, disk tray drawing lever 15 is moved in the direction of arrow "D," to draw disk tray 2 from disk tray drawer 3.

Here, since a plurality of guide rollers 6 is installed in disk changer 4, disk tray 2 is drawn easily by guide roller 6.

When disk tray 2 is completely withdrawn, disk tray drawing lever 15 will enable fourth sensor 17, thereby stopping motor 1 and controlling solenoid 37 to move push lever 38 in the direction of arrow "E." Accordingly, power switching plate 36 is pushed by push lever 38 in the direction to cause idler gear 35 to once again engage with first elevating gear 21.

Also, when idler gear 35 is combined with first elevating gear 21, motor 1 is driven again, to rotate first elevating gear 21, worm wheel 23, second elevating gears 24, and second connecting gears 26a, 26b, 26c, 26d, 26e and 26f. Accordingly, disk changer 4 is moved up and down along racks 25a, 25b, 25c and 25d, thereby shifting disk tray 2 toward the disk driving portion.

As illustrated above, since a disk changer driving apparatus of a multi-disk player according to the present invention is structured so that a disk tray drawing lever driving means and a disk changer elevating means are driven by a single motor, fewer motors and fewer motor controllers are needed, compared with the conventional method which is driven by plural motors. Thus, the structure is simplified and the cost is reduced.

What is claimed is:

1. A disk changer driving apparatus of a multi-disk player comprising:

a drawer having multiple disk trays placed therein;

a disk changer positioned with respect to said drawer so as to be movable to be positioned opposite said selected disk trays;

drawing lever driving means for driving a drawing lever to extract and replace selected disk trays, said drawing lever driving means having a plurality of first connecting gears successively engaged with one another;

disk changer driving means for driving said disk changer to positions opposite selected disk trays, said disk changer driving means having a first elevating gear;

a motor; and power switching means for switchably transmitting the power of said motor selectively to said first elevating gear of said disk changer driving means and a first of said plurality of first connecting gears of said drawing lever driving means, wherein said power switching means comprises:

a driving gear rotatable by said motor;

an idler gear engaged with said driving gear;

a cam plate having a cam surface, said idler gear moving along said cam surface of said cam plate to alter the position of said idler gear between a first position where it engages and drives said disk changer driving means and a second position where it engages and drives said drawing lever driving means; and means for controlling the position of said cam plate to select the engagement of said idler gear and said disk changing driving means and said drawing lever driving means.

2. The disk changer driving apparatus as claimed in claim 1, wherein said disk tray drawing lever driving means further comprises:

a pulley gear engaged with the final one of said first connecting gears; and a first belt driven by said pulley gear;

said drawing lever being installed on said belt on one side thereof.

3. The disk changer driving apparatus as claimed in claim 2, wherein said disk changer driving means further comprises:

a worm gear, disposed on an upper portion of said first elevating gear;

a connecting rod having a worm wheel engaged with said worm gear installed on said first elevating gear;

second elevating gears installed respectively at both ends of said connecting rod so as to rotate with said worm wheel and said rod;

racks installed respectively adjacently to the corners of said disk changer; and second connecting gears installed respectively in both sides of said disk changer and connecting said second elevating gear and racks so as to move said disk changer elevationally along said racks.

4. The disk changer driving apparatus of a multi-disk player as recited in claim 1, wherein only one idler gear moves along said cam surface of said cam plate.

5. A disk changer driving apparatus of a multi-disk player comprising:

a drawer having multiple disk trays placed therein;

a disk changer positioned with respect to said drawer so as to be movable to be positioned opposite said selected disk trays;

drawing lever driving means for driving a drawing lever to extract and replace selected disk trays, said drawing lever driving means having a plurality of first connecting gears successively engaged with one another;

disk changer driving means for driving said disk changer to positions opposite selected disk trays, said disk changer driving means having a first elevating gear;

a motor; and power switching means for switchably transmitting the power of said motor selectively to said first elevating gear of said disk changer driving means and a first of said plurality of first connecting gears of said drawing lever driving means, wherein said power switching means comprises:

a driving gear driven by said motor;

an idler gear engaged with said driving gear and selectively engaged with the first connecting gear of said disk tray drawing lever driving means and the first elevating gear of said disk changer driving means, respectively;

a power switching plate engaged with said idler gear and biased by a torsion spring to force said idler gear into engagement with said first elevating gear and out of engagement with said first connecting gear of said disk changer drawing lever driving means; and a push lever movable from side to side by a solenoid into and out of engagement with said power switching plate to cause said power switching plate to move against the bias of said torsion spring, thereby causing said idler gear to disengage from said first elevating gear and to engage with said first connecting gear of said disk tray drawing lever driving means.

* * * * *